US011677357B2

(12) United States Patent
Drogi et al.

(10) Patent No.: US 11,677,357 B2
(45) Date of Patent: *Jun. 13, 2023

(54) ENVELOPE TRACKING SYSTEM WITH MODELING OF A POWER AMPLIFIER SUPPLY VOLTAGE FILTER

(71) Applicant: Skyworks Solutions, Inc., Irvine, CA (US)

(72) Inventors: Serge Francois Drogi, Flagstaff, AZ (US); Florinel G. Balteanu, Irvine, CA (US); Shayan Farahvash, Kensington, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/302,993

(22) Filed: May 18, 2021

(65) Prior Publication Data

US 2021/0273614 A1 Sep. 2, 2021

Related U.S. Application Data

(63) Continuation of application No. 16/678,696, filed on Nov. 8, 2019, now Pat. No. 11,038,471.

(Continued)

(51) Int. Cl.
*H03F 1/30* (2006.01)
*H03F 1/02* (2006.01)
(Continued)

(52) U.S. Cl.
CPC .......... *H03F 1/304* (2013.01); *G06F 30/367* (2020.01); *H03F 1/0227* (2013.01); *H03F 3/195* (2013.01);
(Continued)

(58) Field of Classification Search
CPC .................................. H03F 1/30; H03G 3/20
(Continued)

(56) References Cited

U.S. PATENT DOCUMENTS 6,438,365 B1 8/2002 Balteanu
6,704,560 B1 3/2004 Balteanu et al.
(Continued)

OTHER PUBLICATIONS

Gilabert et al., "Look-Up Table Implementation of a Slow Envelope Dependent Digital Predistorter for Envelope Tracking Power Amplifiers," IEEE Microwave and Wireless Components Letters, vol. 22, No. 2, Feb. 2012, in 3 pages.
(Continued)

*Primary Examiner* — Henry Choe
(74) *Attorney, Agent, or Firm* — Knobbe, Martens, Olson & Bear, LLP

(57) ABSTRACT

Envelope tracking systems with modeling for power amplifier supply voltage filtering are provided herein. In certain embodiments, an envelope tracking system includes a supply voltage filter, a power amplifier that receives a power amplifier supply voltage through the supply voltage filter, and an envelope tracker that generates the power amplifier supply voltage. The power amplifier provides amplification to a radio frequency (RF) signal that is generated based on digital signal data, and the envelope tracker generates the power amplifier supply voltage based on an envelope signal corresponding to an envelope of the RF signal. The envelope tracking system further includes digital modeling circuitry that models the supply voltage filter and operates to digitally compensate the digital signal data for effects of the supply voltage filter, such as distortion.

20 Claims, 14 Drawing Sheets

Related U.S. Application Data

(60) Provisional application No. 62/769,982, filed on Nov. 20, 2018.

(51) Int. Cl.
*H03F 3/195* (2006.01)
*H03F 3/24* (2006.01)
*G06F 30/367* (2020.01)
*G06F 119/06* (2020.01)
*G06F 119/10* (2020.01)

(52) U.S. Cl.
CPC .......... *H03F 3/245* (2013.01); *G06F 2119/06* (2020.01); *G06F 2119/10* (2020.01); *H03F 2200/102* (2013.01); *H03F 2200/504* (2013.01); *H03F 2201/3227* (2013.01)

(58) Field of Classification Search
USPC ..................................... 330/297, 129, 149
See application file for complete search history.

(56) References Cited

U.S. PATENT DOCUMENTS

| | | | |
|---|---|---|---|
| 6,977,976 B1 | 12/2005 | Birkett et al. | |
| 7,496,339 B2 | 2/2009 | Balteanu et al. | |
| 8,140,028 B2 | 3/2012 | Balteanu et al. | |
| 8,351,873 B2 | 1/2013 | Balteanu et al. | |
| 8,718,188 B2 | 5/2014 | Balteanu et al. | |
| 8,786,371 B2 | 7/2014 | Popplewell et al. | |
| 8,981,847 B2 | 3/2015 | Balteanu | |
| 9,083,455 B2 | 7/2015 | Popplewell et al. | |
| 9,092,393 B2 | 7/2015 | Whitefield et al. | |
| 9,118,277 B2 | 8/2015 | Balteanu et al. | |
| 9,143,096 B2 | 9/2015 | Balteanu et al. | |
| 9,189,430 B2 | 11/2015 | Ross et al. | |
| 9,197,128 B2 | 11/2015 | Popplewell et al. | |
| 9,288,098 B2 * | 3/2016 | Yan | H04B 1/0475 |
| 9,294,054 B2 | 3/2016 | Balteanu et al. | |
| 9,391,648 B2 | 7/2016 | Popplewell et al. | |
| 9,425,833 B2 | 8/2016 | Popplewell et al. | |
| 9,445,371 B2 | 9/2016 | Khesbak et al. | |
| 9,520,907 B2 * | 12/2016 | Peng | H03F 1/0227 |
| 9,584,070 B2 | 2/2017 | Balteanu et al. | |
| 9,588,529 B2 | 3/2017 | Balteanu et al. | |
| 9,606,947 B2 | 3/2017 | Ross et al. | |
| 9,668,215 B2 | 5/2017 | Balteanu et al. | |
| 9,673,707 B2 | 6/2017 | Popplewell et al. | |
| 9,698,832 B2 | 7/2017 | Popplewell et al. | |
| 9,774,300 B2 | 9/2017 | Jin et al. | |
| 9,800,274 B2 * | 10/2017 | Yan | H04W 52/52 |
| 9,806,676 B2 | 10/2017 | Balteanu et al. | |
| 9,831,834 B2 | 11/2017 | Balteanu et al. | |
| 9,876,473 B2 | 1/2018 | Khesbak et al. | |
| 9,893,682 B2 | 2/2018 | Zhu et al. | |
| 9,935,582 B2 | 4/2018 | Balteanu et al. | |
| 9,948,241 B2 | 4/2018 | Popplewell et al. | |
| 9,971,377 B2 | 5/2018 | Balteanu et al. | |
| 9,973,088 B2 | 5/2018 | Balteanu et al. | |
| 9,990,322 B2 | 6/2018 | Whitefield et al. | |
| 9,991,856 B2 | 6/2018 | Khesbak et al. | |
| 11,038,471 B2 | 6/2021 | Drogi et al. | |
| 2017/0131734 A1 | 5/2017 | Balteanu et al. | |
| 2017/0195972 A1 | 7/2017 | Drogi et al. | |
| 2017/0223632 A1 | 8/2017 | Balteanu et al. | |
| 2017/0228332 A1 | 8/2017 | Ross et al. | |
| 2017/0338773 A1 | 11/2017 | Balteanu et al. | |
| 2018/0076772 A1 | 3/2018 | Khesbak et al. | |
| 2018/0138862 A1 | 5/2018 | Balteanu et al. | |
| 2018/0152945 A1 | 5/2018 | Balteanu | |
| 2018/0159476 A1 | 6/2018 | Balteanu et al. | |
| 2018/0159478 A1 | 6/2018 | Balteanu et al. | |
| 2018/0167037 A1 | 6/2018 | Zhu et al. | |
| 2018/0234095 A1 | 8/2018 | Balteanu et al. | |
| 2018/0278214 A1 | 9/2018 | Jin et al. | |
| 2018/0287573 A1 | 10/2018 | Khesbak et al. | |
| 2018/0294776 A1 | 10/2018 | Popplewell et al. | |
| 2018/0302036 A1 | 10/2018 | Balteanu et al. | |
| 2018/0331659 A1 | 11/2018 | Khesbak et al. | |
| 2018/0351454 A1 | 12/2018 | Khesbak et al. | |
| 2018/0375476 A1 | 12/2018 | Balteanu et al. | |
| 2018/0375483 A1 | 12/2018 | Balteanu et al. | |
| 2019/0020315 A1 | 1/2019 | Khesbak et al. | |
| 2019/0123690 A1 | 4/2019 | Balteanu et al. | |
| 2019/0158046 A1 | 5/2019 | Lehtola et al. | |
| 2019/0165736 A1 | 5/2019 | Khesbak et al. | |
| 2019/0190462 A1 | 6/2019 | Zhu et al. | |
| 2019/0229621 A1 | 7/2019 | Balteanu et al. | |
| 2019/0341888 A1 | 11/2019 | Drogi et al. | |
| 2019/0372526 A1 | 12/2019 | Balteanu et al. | |
| 2019/0372628 A1 | 12/2019 | Balteanu et al. | |
| 2019/0386617 A1 | 12/2019 | Naraine et al. | |
| 2020/0067406 A1 | 2/2020 | Khesbak et al. | |
| 2020/0099343 A1 | 3/2020 | Khesbak et al. | |
| 2020/0112300 A1 | 4/2020 | Balteanu et al. | |
| 2020/0127619 A1 | 4/2020 | Khesbak et al. | |
| 2020/0154434 A1 | 5/2020 | Balteanu | |
| 2020/0162028 A1 | 5/2020 | Balteanu et al. | |
| 2020/0259458 A1 | 8/2020 | Balteanu et al. | |
| 2020/0259459 A1 | 8/2020 | Balteanu et al. | |
| 2020/0336110 A1 | 10/2020 | Drogi et al. | |
| 2020/0336122 A1 | 10/2020 | Lin et al. | |
| 2020/0343865 A1 | 10/2020 | Balteanu et al. | |
| 2021/0099134 A1 * | 4/2021 | Drogi | H03F 3/245 |
| 2022/0069775 A1 * | 3/2022 | Balteanu | H03F 1/0238 |
| 2022/0085766 A1 * | 3/2022 | Balteanu | H03F 3/195 |

OTHER PUBLICATIONS

Wolff et al., "Highly Efficient 1.8-GHz Amplifier with 120-MHz Class-G Supply Modulation," IEEE Transactions on Microwave Theory and Techniques, vol. 65, No. 12, Dec. 2017, in 8 pages.

* cited by examiner

ENVELOPE TRACKING SYSTEM WITH MODELING OF A POWER AMPLIFIER SUPPLY VOLTAGE FILTER

CROSS-REFERENCE TO RELATED APPLICATIONS

This application is a continuation of U.S. application Ser. No. 16/678,696, filed Nov. 8, 2019, and entitled "ENVELOPE TRACKING SYSTEM WITH MODELING OF A POWER AMPLIFIER SUPPLY VOLTAGE FILTER," which claims the benefit of priority under 35 U.S.C. § 119 of U.S. Provisional Patent Application No. 62/769,982, filed Nov. 20, 2018, and entitled "ENVELOPE TRACKING SYSTEM WITH MODELING OF A POWER AMPLIFIER SUPPLY VOLTAGE FILTER," each of which is herein incorporated by reference in its entirety.

BACKGROUND

Field

Embodiments of the invention relate to electronic systems, and in particular, to power amplifiers for radio frequency (RF) electronics.

Description of the Related Technology

Power amplifiers are used in RF communication systems to amplify RF signals for transmission via antennas. It is important to manage the power of RF signal transmissions to prolong battery life and/or provide a suitable transmit power level.

Examples of RF communication systems with one or more power amplifiers include, but are not limited to, mobile phones, tablets, base stations, network access points, customer-premises equipment (CPE), laptops, and wearable electronics. For example, in wireless devices that communicate using a cellular standard, a wireless local area network (WLAN) standard, and/or any other suitable communication standard, a power amplifier can be used for RF signal amplification. An RF signal can have a frequency in the range of about 30 kHz to 300 GHz, such as in the range of about 410 MHz to about 7.125 GHz for certain communications standards.

SUMMARY

In certain embodiments, the present disclosure relates to an envelope tracking system. The envelope tracking system includes a modulator configured to generate a radio frequency signal based on digital signal data, a supply voltage filter, a power amplifier configured to amplify the radio frequency signal and to receive power from a power amplifier supply voltage through the supply voltage filter, an envelope tracker configured to generate the power amplifier supply voltage based on an envelope signal corresponding to an envelope of the radio frequency signal, and digital modeling circuitry operable to model the supply voltage filter and to compensate the digital signal data for distortion arising from the supply voltage filter.

In various embodiments, the envelope tracking system further includes an analog-to-digital converter configured to generate a digital representation of the power amplifier supply voltage, the digital modeling circuitry calibrated based on the digital representation of the power amplifier supply voltage.

In some embodiments, the envelope tracking system further includes an amplitude extraction circuit configured to process the digital signal data to generate digital envelope data and a shaping circuit configured to process the digital envelope data to generate shaped envelope data, the envelope signal generated based on the shaped envelope data. According to a number of embodiments, the digital modeling circuitry is further configured to compensate the digital signal data based on the shaped envelope data. In accordance with several embodiments, the envelope tracking system further includes digital pre-distortion circuitry configured to digitally pre-distort the digital signal data, the amplitude extraction circuit configured to generate the digital envelope data based on the digital signal data after digital pre-distortion. According to a various, the amplitude extraction circuit includes a coordinate rotation digital computation circuit. In accordance with a number of embodiments, the shaping table includes an envelope tracking lookup table mapping a plurality of envelope levels of the digital envelope data to a plurality of corresponding shaped envelope levels of the shaped envelope data.

In several embodiments, the supply voltage filter includes at least one series inductor.

In a number of embodiments, the supply voltage filter includes at least one shunt capacitor.

In various embodiments, the envelope tracking system includes digital pre-distortion circuitry configured to digitally pre-distort the digital signal data, the digital pre-distortion circuitry configured to receive a digital compensation signal from the digital modeling circuitry.

In some embodiments, the envelope tracker is a multi-level envelope tracker including a DC-to-DC converter configured to output a plurality of regulated voltages and a modulator having an output configured to control the power amplifier supply voltage based on the plurality of regulated voltages and the envelope signal.

In certain embodiments, the present disclosure relates to a mobile device. The mobile device includes a transceiver configured to generate a radio frequency signal based on digital signal data, a front end circuit including a supply voltage filter and a power amplifier configured to amplify the radio frequency signal and to receive power from a power amplifier supply voltage through the supply voltage filter, a power management circuit including an envelope tracker configured to generate the power amplifier supply voltage based on an envelope signal corresponding to an envelope of the radio frequency signal, and a baseband circuit including digital modeling circuitry operable to model the supply voltage filter and to compensate the digital signal data for distortion arising from the supply voltage filter.

In various embodiments, the baseband circuit further includes an analog-to-digital converter configured to generate a digital representation of the power amplifier supply voltage, the digital modeling circuitry calibrated based on the digital representation.

In several of embodiments, the baseband circuit further includes an amplitude extraction circuit configured to process the digital signal data to generate digital envelope data and a shaping circuit configured to process the digital envelope data to generate shaped envelope data, the envelope signal generated based on the shaped envelope data. According to some embodiments, the digital modeling circuitry is further configured to compensate the digital signal data based on the shaped envelope data. In accordance with a number of embodiments, the baseband circuit further includes digital pre-distortion circuitry configured to digitally pre-distort the digital signal data, the amplitude extraction circuit configured to generate the digital envelope data based on the digital signal data after digital pre-distortion. According to several embodiments, the amplitude extraction circuit includes a coordinate rotation digital computation circuit. In accordance with some embodiments, the shaping table includes an envelope tracking lookup table mapping a plurality of envelope levels of the digital envelope data to a plurality of corresponding shaped envelope levels of the shaped envelope data.

In various embodiments, the supply voltage filter includes at least one series inductor.

In a number of embodiments, the supply voltage filter includes at least one shunt capacitor.

In several embodiments, the baseband circuit further includes digital pre-distortion circuitry configured to digitally pre-distort the digital signal data, the digital pre-distortion circuitry configured to receive a digital compensation signal from the digital modeling circuitry.

In some embodiments, the envelope tracker is a multi-level envelope tracker including a DC-to-DC converter configured to output a plurality of regulated voltages and a modulator having an output configured to control the power amplifier supply voltage based on the plurality of regulated voltages and the envelope signal.

In certain embodiments, the present disclosure relates to a method of envelope tracking. The method further includes generating a radio frequency signal based on digital signal data, amplifying the radio frequency signal using a power amplifier, providing a power amplifier supply voltage to the power amplifier through a supply voltage filter, generating the power amplifier supply voltage based on an envelope signal corresponding to an envelope of the radio frequency signal using an envelope tracker, and compensating the digital signal data for distortion arising from the supply voltage filter using a digital model of the supply voltage filter.

In various embodiments, the method further includes generating a digital representation of the power amplifier supply voltage using an analog-to-digital converter, and calibrating the digital model based on the digital representation.

In several embodiments, the method further includes processing the digital signal data to generate digital envelope data, shaping the digital envelope data to generate shaped envelope data, and generating the envelope signal based on the shaped envelope data. According to a number of embodiments, the method further includes compensating the digital signal data using the digital model based on the shaped envelope data. In accordance with various embodiments, the method further includes digitally pre-distorting the digital signal data before processing the digital signal data to generate digital envelope data.

In some embodiments, the supply voltage filter includes at least one series inductor.

In various embodiments, the supply voltage filter includes at least one shunt capacitor.

In a number of embodiments, the method further includes digitally pre-distorting the digital signal data based on the digital model.

In several embodiments, generating the power amplifier supply voltage includes outputting a plurality of regulated voltages using a DC-to-DC converter, and controlling the power amplifier supply voltage using a modulator that receives the plurality of regulated voltages and the envelope signal.

DETAILED DESCRIPTION OF EMBODIMENTS

Figure 1:
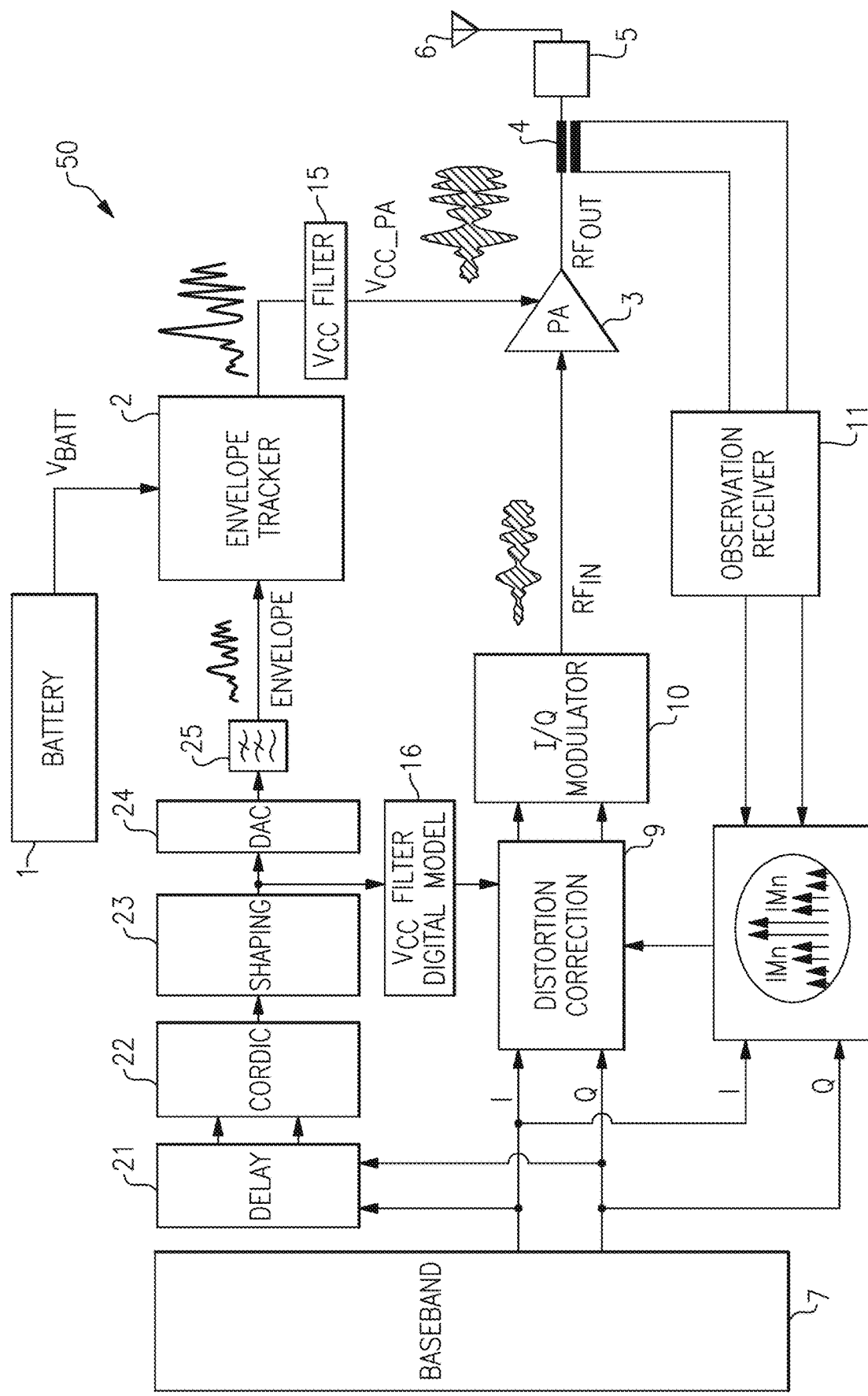
FIG. 1 is a schematic diagram of one embodiment of an envelope tracking system for a power amplifier.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Envelope tracking is a technique that can be used to increase power added efficiency (PAE) of a power amplifier by efficiently controlling a voltage level of a power amplifier supply voltage in relation to an envelope of a radio frequency (RF) signal amplified by the power amplifier. Thus, when the envelope of the RF signal increases, the voltage supplied to the power amplifier can be increased. Likewise, when the envelope of the RF signal decreases, the voltage supplied to the power amplifier can be decreased to reduce power consumption.

Envelope tracking systems with modeling for power amplifier supply voltage filtering are provided herein. In certain embodiments, an envelope tracking system includes a supply voltage filter, a power amplifier that receives a power amplifier supply voltage through the supply voltage filter, and an envelope tracker that generates the power amplifier supply voltage. The power amplifier provides amplification to a radio frequency (RF) signal that is generated based on digital signal data, and the envelope tracker generates the power amplifier supply voltage based on an envelope signal corresponding to an envelope of the RF signal. The envelope tracking system further includes digital modeling circuitry that models the supply voltage filter and operates to digitally compensate the digital signal data for effects of the supply voltage filter, such as distortion.

Absent compensation, loading of the power amplifier on the supply voltage filter results in uncontrolled voltage swing that distorts the power amplifier supply voltage and/or RF signal output of the power amplifier. By modeling the supply voltage filter, a system identification can be calculated and taken into account as voltage distortion. In certain implementations, the calculated voltage distortion is used in subsequent open loop digital pre-distortion (DPD) calculations in pre-distortion circuitry.

The digital modeling circuitry can be implemented in a wide variety of ways. In one example, the digital modeling circuitry includes a finite impulse response (FIR) filter operable to model loading of the power amplifier on the supply voltage filter. However, other types of circuitry can be used to account for the response of current coming out of the power amplifier and loading the supply voltage filter. In certain implementations, the digital modeling circuitry receives a digital representation of the envelope signal after shaping to aid in modeling.

In certain implementations, an analog-to-digital converter (ADC) digitizes a waveform of the power amplifier supply voltage of the power amplifier, and the digitized supply voltage is used for model building and/or calibration of the digital modeling circuitry. By implementing the envelope tracking system in this manner, the loading effects of the filter are modeled and appropriately compensated for. For example, implementing the envelope tracking system in this manner enhances the completeness of the digital model of the supply voltage path to the power amplifier, thereby allowing a more precise open loop DPD calculation.

The envelope tracking systems herein can provide a number of advantages, including, but not limited to, improved adjacent channel leakage ratio (ACLR) and/or error vector magnitude (EVM). For example, ACLR can be substantially improved, particularly at high power. Moreover, the teachings herein can provide enhanced tracking of mismatch changes to performance due to power amplifier loading and/or improved memory modeling of the power amplifier system due to isolation of memory effects arising from the supply voltage filter.

The filter modeling can be used for a wide variety of envelope tracking systems, including, but not limited to, multi-level envelope trackers. A multi-level envelope tracker can include a multi-level supply (MLS) DC-to-DC converter that generates two or more regulated voltages of different voltage levels, an MLS modulator that outputs a selected regulated voltage chosen from the regulated voltages, and a filter that filters the MLS modulator's output to generate a power amplifier supply voltage for a power amplifier. Since multi-level envelope trackers operate with supply voltage filters having non-zero output impedance, filter modeling can aid in accounting for distortion arising from such impedance. Thus, filter modeling can enhance performance in multi-level envelope trackers as well as in other types of envelope tracking systems.

FIGS. 1-3 and 7A-7B depict schematic diagram of various embodiments of envelope tracking systems for a power amplifier. However, the teachings herein are applicable to envelope trackers implemented in a wide variety of ways. Accordingly, other implementations are possible.

FIG. 1 is a schematic diagram of one embodiment of an envelope tracking system 50. The envelope tracking system 50 includes a battery 1, an envelope tracker 2, a power amplifier 3, a directional coupler 4, a duplexing and switching circuit (or other antenna access control circuit) 5, an antenna 6, a baseband processor 7, a digital pre-distortion (DPD) or distortion correction circuit 9, an I/Q modulator 10, an observation receiver 11, an intermodulation detection circuit 12, a power amplifier supply voltage ($V_{CC}$) filter 15, a $V_{CC}$ filter digital model or digital modeling circuitry 16, an envelope delay circuit 21, a coordinate rotation digital computation (CORDIC) circuit 22, a shaping circuit 23, a digital-to-analog converter 24, and a reconstruction filter 25.

The envelope tracking system 50 of FIG. 1 illustrates one embodiment of an envelope tracking system implemented in accordance with one or more features of the present disclosure. However, the teachings herein are applicable to RF systems implemented in a wide variety of ways.

The baseband processor 7 operates to generate an in-phase (I) signal and a quadrature-phase (Q) signal, which correspond to signal components of a sinusoidal wave or signal of a desired amplitude, frequency, and phase. For example, the I signal and the Q signal provide an equivalent representation of the sinusoidal wave. In certain implementations, the I and Q signals are outputted in a digital format. The baseband processor 7 can be any suitable processor for processing baseband signals. For instance, the baseband processor 7 can include a digital signal processor, a microprocessor, a programmable core, or any combination thereof.

The DPD circuit 9 operates to provide digital shaping to the I and Q signals to generate digitally pre-distorted I and Q signals. In the illustrated embodiment, the DPD provided by the DPD circuit 9 is controlled based on amount of intermodulation detected by the intermodulation detection circuit 12 and by a digital compensation signal from the $V_{CC}$ filter digital model 16. The DPD circuit 9 serves to reduce a distortion of the power amplifier 3 and/or to increase the efficiency of the power amplifier 3.

The I/Q modulator 10 receives the digitally pre-distorted I and Q signals, which are processed to generate the RF signal $RF_{IN}$. For example, the I/Q modulator 10 can include DACs configured to convert the digitally pre-distorted I and Q signals into an analog format, mixers for upconverting the analog I and Q signals to radio frequency, and a signal combiner for combining the upconverted I and Q signals into the RF signal $RF_{IN}$. In certain implementations, the I/Q modulator 10 can include one or more filters configured to filter frequency content of signals processed therein.

The envelope delay circuit 21 delays the I and Q signals from the baseband processor 7. Additionally, the CORDIC circuit 22 processes the delayed I and Q signals to generate a digital envelope signal representing an envelope of the RF signal $RF_{IN}$. Although FIG. 1 illustrates an implementation using the CORDIC circuit 22, an analog envelope signal can be obtained in other ways, for instance, using any suitable envelope extraction circuit.

The shaping circuit 23 operates to shape the digital envelope signal to enhance the performance of the envelope tracking system 50. In certain implementations, the shaping circuit 23 includes a shaping table or lookup table that maps each level of the digital envelope signal to a corresponding shaped envelope signal level. Envelope shaping can aid in controlling linearity, distortion, and/or efficiency of the power amplifier 3.

In the illustrated embodiment, the shaped envelope signal is a digital signal that is converted by the DAC 24 to a pre-filtered analog envelope signal. Additionally, the pre-filtered analog envelope signal is filtered by the reconstruction filter 25 to generate an analog envelope signal (ENVELOPE) for the envelope tracker 2. In certain implementations, the reconstruction filter 25 includes a low pass filter.

With continuing reference to FIG. 1, the envelope tracker 2 receives the analog envelope signal from the reconstruction filter 25 and a battery voltage $V_{BATT}$ from the battery 1, and uses the analog envelope signal to generate a power amplifier supply voltage $V_{CC\_PA}$ for the power amplifier 3 that changes in relation to the envelope of the RF signal $RF_{IN}$.

As shown in FIG. 1, the power amplifier 3 receives the power amplifier supply voltage $V_{CC\_PA}$ from the envelope tracker 2 through the $V_{CC}$ filter 15. The $V_{CC}$ filter 15 can be implemented in a wide variety of ways. In one embodiment, the $V_{CC}$ filter 15 includes at least one series inductor and at least one shunt capacitor. For example, the $V_{CC}$ filter 15 can include one or more inductors in series between an output of the envelope tracker 2 and a power supply input of the power amplifier 3, and one or more capacitors in shunt (for instance, to ground) with the inductors. The power amplifier 3 receives the RF signal $RF_{IN}$ from the I/Q modulator 10, and provides an amplified RF signal $RF_{OUT}$ to the antenna 6 through the duplexing and switching circuit 5, in this example.

The directional coupler 4 is positioned between the output of the power amplifier 3 and the input of the duplexing and switching circuit 5, thereby allowing a measurement of output power of the power amplifier 3 that does not include insertion loss of the duplexing and switching circuit 5. The sensed output signal from the directional coupler 4 is provided to the observation receiver 11, which can include mixers for providing down conversion to generate downconverted I and Q signals, and DACs for generating I and Q observation signals from the downconverted I and Q signals.

The intermodulation detection circuit 12 determines an intermodulation product between the I and Q observation signals and the I and Q signals from the baseband processor 7. Additionally, the intermodulation detection circuit 12 controls the DPD provided by the DPD circuit 9. In another embodiment, the intermodulation detection circuit 12 additionally or alternatively controls a delay of the envelope delay circuit 21 and/or other suitable delay circuitry to control alignment between signal and supply voltage.

By including a feedback path from the output of the power amplifier 3 and baseband, the I and Q signals can be dynamically adjusted to optimize the operation of the envelope tracking system 50. For example, configuring the envelope tracking system 50 in this manner can aid in providing power control, compensating for transmitter impairments, and/or in performing DPD.

Although illustrated as a single stage, the power amplifier 3 can include one or more stages. Furthermore, the teachings herein are applicable to communication systems including multiple power amplifiers.

As shown in FIG. 1, the $V_{CC}$ filter digital model 16 receives the shaped envelope signal, and processes the shaped envelope signal to digitally compensate the digital signal data corresponding to the RF input signal $RF_{IN}$ for effects of the $V_{CC}$ filter 15. Absent compensation, loading of the power amplifier 3 on the $V_{CC}$ filter 15 results in uncontrolled voltage swing that distorts the power amplifier supply voltage $V_{CC\_PA}$ and/or RF output signal $RF_{OUT}$.

By digitally modeling the $V_{CC}$ filter 15 using the $V_{CC}$ filter digital model 16, loading of the power amplifier 3 on the $V_{CC}$ filter 15 is accounted for. For example, the $V_{CC}$ filter digital model 16 can operate to digitally compensate the digital signal data to account for the response of current coming out of the power amplifier 3 and loading the $V_{CC}$ filter 15.

Figure 2:
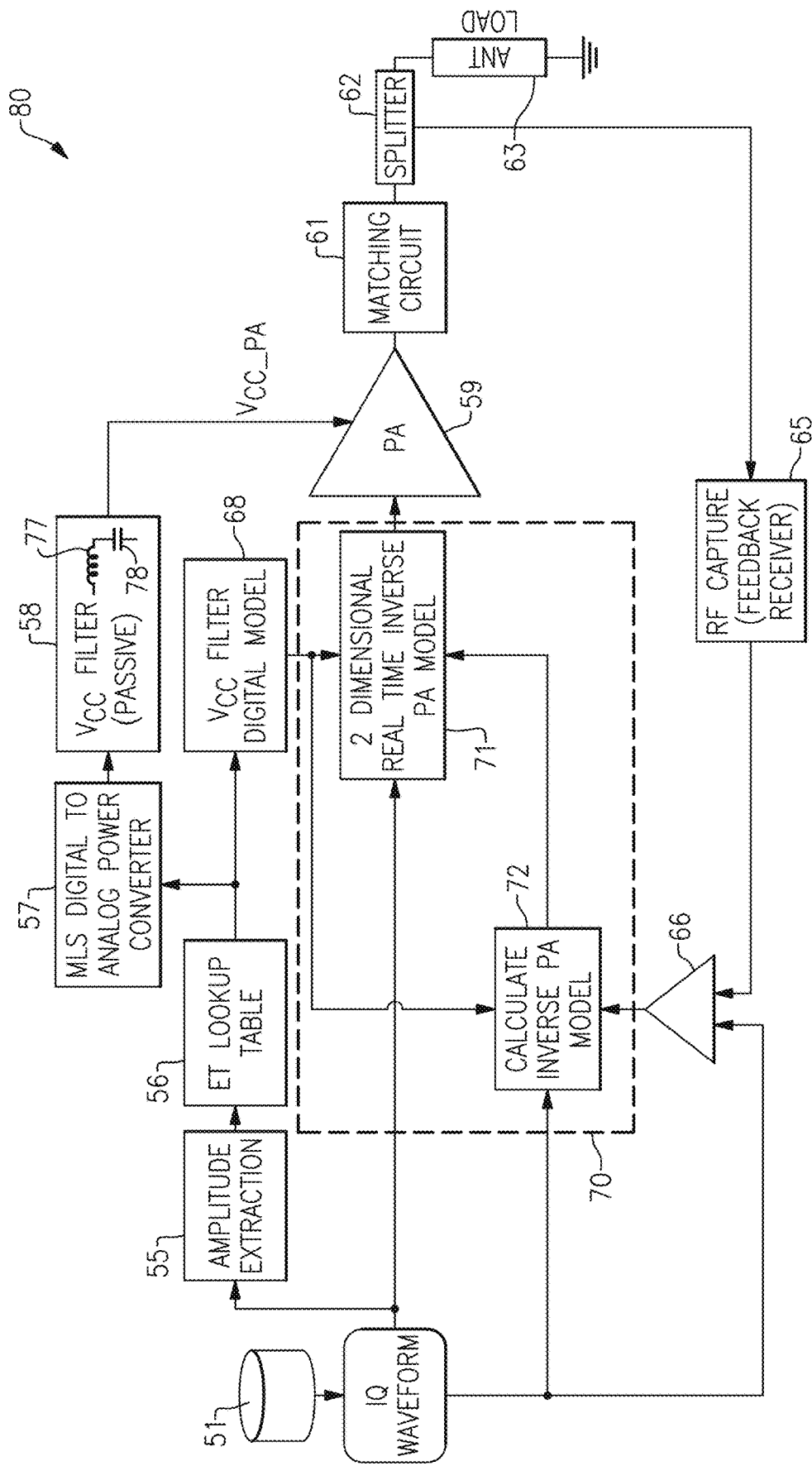
FIG. 2 is a schematic diagram of another embodiment of an envelope tracking system for a power amplifier.

FIG. 2 is a schematic diagram of another embodiment of an envelope tracking system 80. The envelope tracking system 80 includes baseband circuitry 51 that generates an I/Q waveform, amplitude extraction circuitry 55 (for instance, a CORDIC circuit), an envelope tracking lookup table 56, MLS digital-to-analog power converter circuitry 57, a passive $V_{CC}$ filter 58, a power amplifier 59, an output matching circuit 61, a signal splitter 62, an antenna 63 that serves as a load, an RF capture circuit or feedback receiver 65, a digital comparator 66, a $V_{CC}$ filter digital model 68, and I/Q waveform processing circuitry 70.

The I/Q waveform processing circuitry 70 includes an inverse power amplifier model calculation circuit 72 and a two dimensional real time inverse power amplifier modelling circuit 71. The I/Q waveform processing circuitry 70 operates to process the I/Q waveform from the baseband circuitry 51 to generate an RF input signal for the power amplifier 59. Although not depicted in FIG. 2, the I/Q waveform processing circuitry 70 can include an I/Q modulator and/or other signal processing circuitry.

To provide accurate modeling and a corresponding increase in spectral performance, the $V_{CC}$ filter digital model 68 can be implemented to match the actual filter response of the passive $V_{CC}$ filter 58. In one embodiment, the passive $V_{CC}$ filter 58 includes at least one series inductor 77 and at least one shunt capacitor 78.

Loading of the power amplifier 59 on the passive $V_{CC}$ filter 58 at the RF modulation rate results in extra voltage changes at the power amplifier supply voltage $V_{CC\_PA}$ due to the current loading of the power amplifier 59. The currents depend on mismatch at the antenna 63 and can vary in level by a ratio greater than two to one.

This in turn leads to uncertainty as to an amount of voltage ripple present in the power amplifier supply voltage $V_{CC\_PA}$ and/or the actual frequency response of the passive $V_{CC}$ filter 58. Moreover, current from the power amplifier 59 is non-linear with power, and thus an overall frequency response of the passive $V_{CC}$ filter 58 can change non-linearly with power.

In certain communication systems, such as LTE radio systems, RF bandwidth is variable, but the bandwidth of the supply filter (for instance, the passive $V_{CC}$ filter 58) is fixed as determined by the filter's components, for instance, inductors and/or capacitors. Thus, such systems can have a non-flat frequency response when the RF bandwidth is changed and/or operate with memory correction that is adapted when the RF bandwidth of the signal varies.

By implementing the envelope tracking system 80 with the filter digital model 68, a number of advantages are provided, including, but not limited to, improved ACLR, superior EVM, and/or enhanced tracking of mismatch changes to performance due to loading of the power amplifier 59. Moreover, improved modeling is provided due to isolation of memory effects arising from the passive $V_{CC}$ filter 58.

The filter digital model 68 can be implemented in a wide variety of ways including, but not limited to, using a FIR filter to model loading of the power amplifier 59 on the passive $V_{CC}$ filter 58. Thus, compensation is provided to account for the response of current coming out of the power amplifier 59 and loading the passive $V_{CC}$ filter 58.

The illustrated envelope tracking system 80 includes MLS digital-to-analog power converter circuitry 57, which illustrates one example of a multi-level envelope tracker. A multi-level envelope tracker can include a MLS DC-to-DC converter that generates two or more regulated voltages of different voltage levels, an MLS modulator that outputs a selected regulated voltage chosen from the regulated voltages based on an envelope signal (corresponding to digital shaped envelope data from the envelope tracking lookup table 56, in this example), and a filter that filters the MLS modulator's output to generate a power amplifier supply voltage for a power amplifier.

Digital modeling of a supply voltage filter is applicable to a wide variety of types of envelope tracking systems including, but not limited to, envelope tracking systems using a multi-level envelope tracker.

Figure 3:
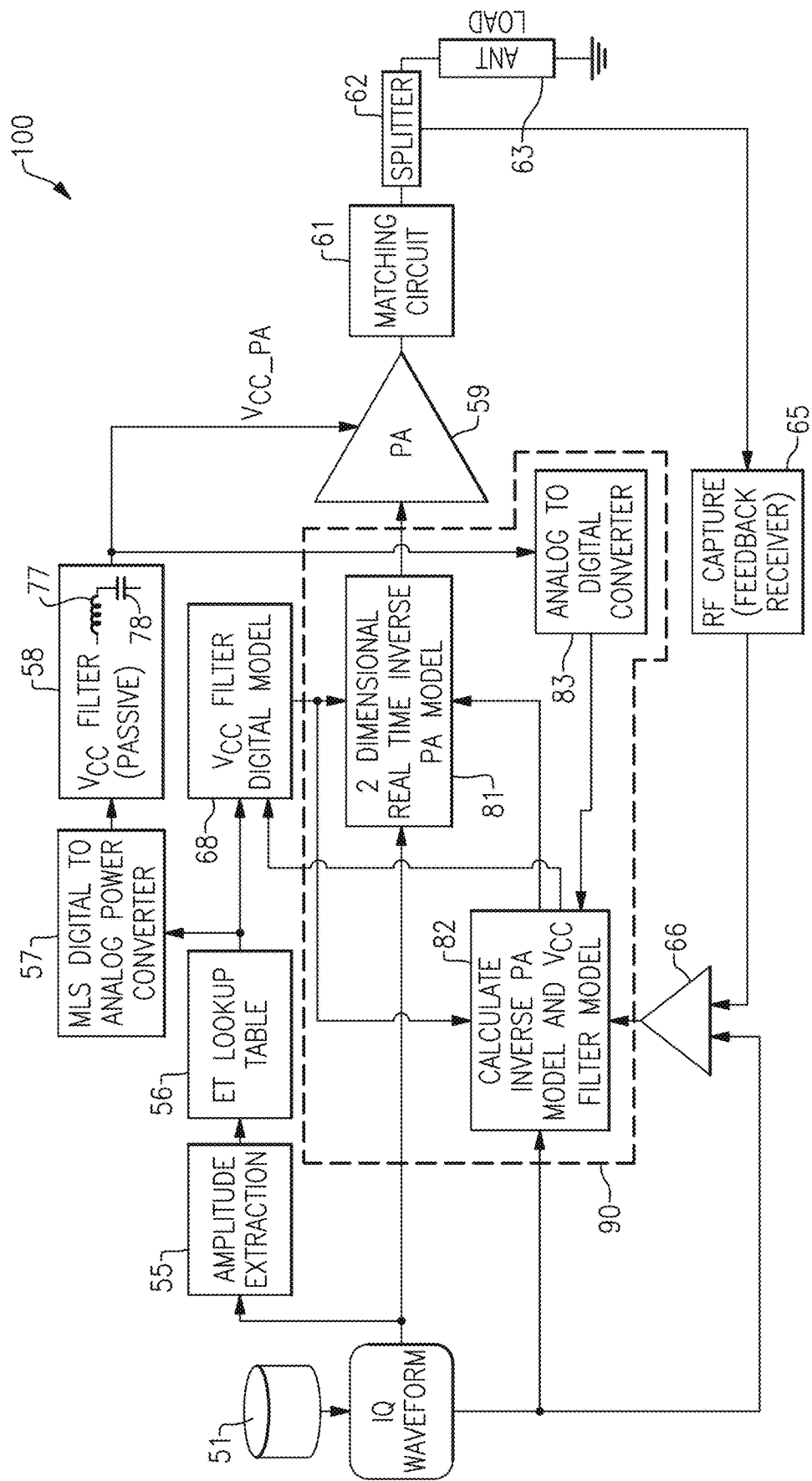
FIG. 3 is a schematic diagram of another embodiment of an envelope tracking system for a power amplifier.

FIG. 3 is a schematic diagram of another embodiment of an envelope tracking system 100. The envelope tracking system 100 of FIG. 3 is similar to the envelope tracking system 80 of FIG. 2, except that the envelope tracking system includes a different implementation of I/Q waveform processing circuitry 90.

For example, the I/Q waveform processing circuitry 90 of FIG. 3 includes a two dimensional real time inverse power amplifier modeling circuit 81, an inverse power amplifier model and $V_{CC}$ filter digital model calculation circuit 82, and an analog-to-digital converter (ADC) 83.

As shown in FIG. 3, the ADC 83 generates a digital representation of the power amplifier supply voltage $V_{CC\_PA}$ to aid in modeling. For example, the digitized supply voltage can be used to build and/or calibrate digital modeling circuitry. By implementing the envelope tracking system in this manner, the loading effects of the filter are modeling and appropriately compensated for. For example, implementing the envelope tracking system in this manner enhances the completeness of the digital model of the supply voltage path to the power amplifier, thereby allowing a more precise open loop DPD calculation.

Thus, with the addition of a voltage sensing device (the ADC 83, in this example) at the power amplifier supply voltage node, the filter modeling can be calculated and/or calibrated to accurately match the passive $V_{CC}$ filter 58 across various conditions of the power amplifier 59, including mismatch such as voltage standing wave ratio (VSWR).

Moreover, a separate or independent estimate of the actual response of the passive $V_{CC}$ filter 58 allows for the DPD power amplifier model to remain substantially constant and/or memoryless, regardless of the RF signal bandwidth used. This is particularly advantageous in LTE systems and/or other communication systems in which RF bandwidth is variable (for instance, by allocating a desired number of resource blocks or RBs).

Figure 4A:
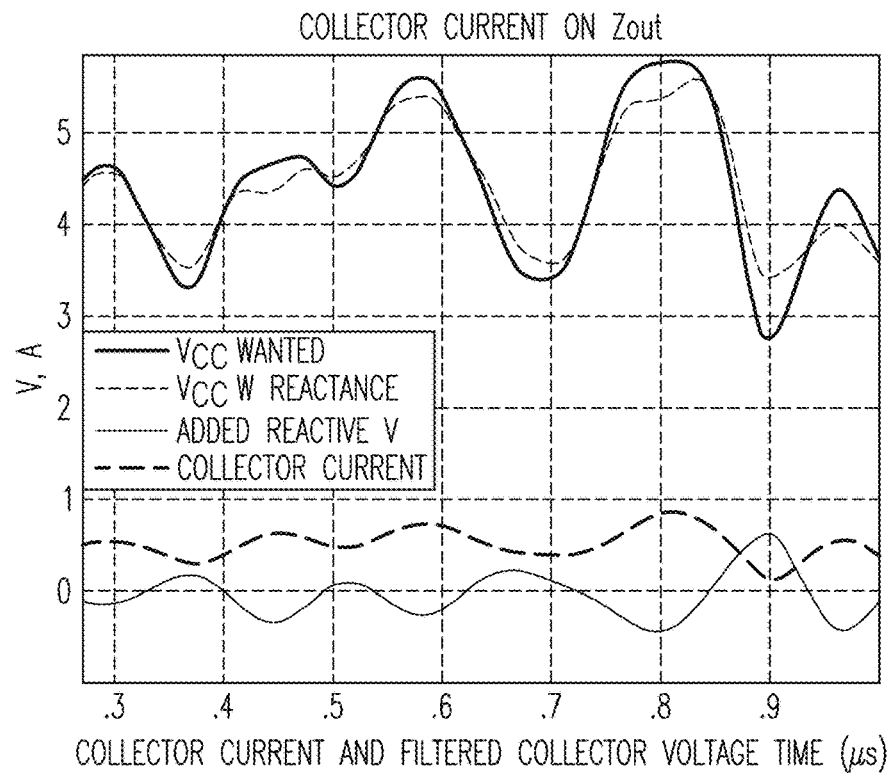
FIG. 4A is a graph of one example of collector current and voltage characteristics versus time.

FIG. 4A is a graph of one example of collector current and voltage characteristics versus time. The graph includes plot of wanted or desired $V_{CC}$, $V_{CC}$ accounting for reactance, an amount of added reactive voltage, and a collector current of the power amplifier (implemented using a bipolar transistor operating in a common emitter configuration, in this example).

Figure 4B:
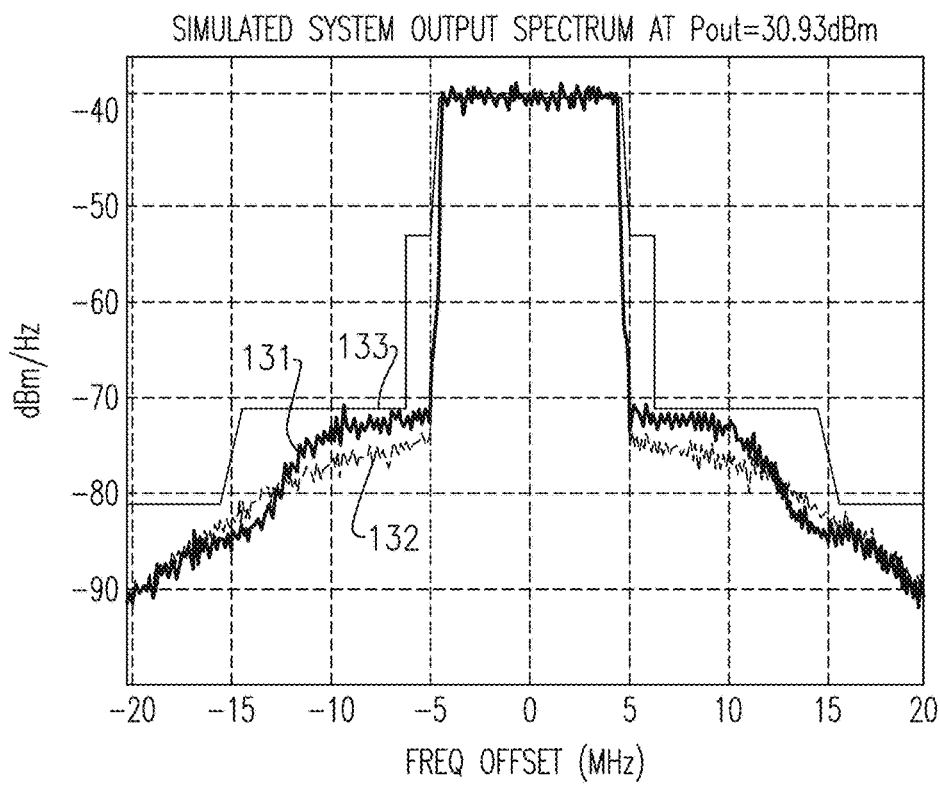
FIG. 4B is a graph of one example of system output spectrum.

FIG. 4B is a graph of one example of system output spectrum. The system output spectrum includes a calculated response 131 without consideration of reactance, a response 132 with added reactance to the filter model, and a reference response 133. In this example, reactance is measured using an ADC having an input coupled to the power amplifier's supply voltage ($V_{CC}$).

Figure 5A:
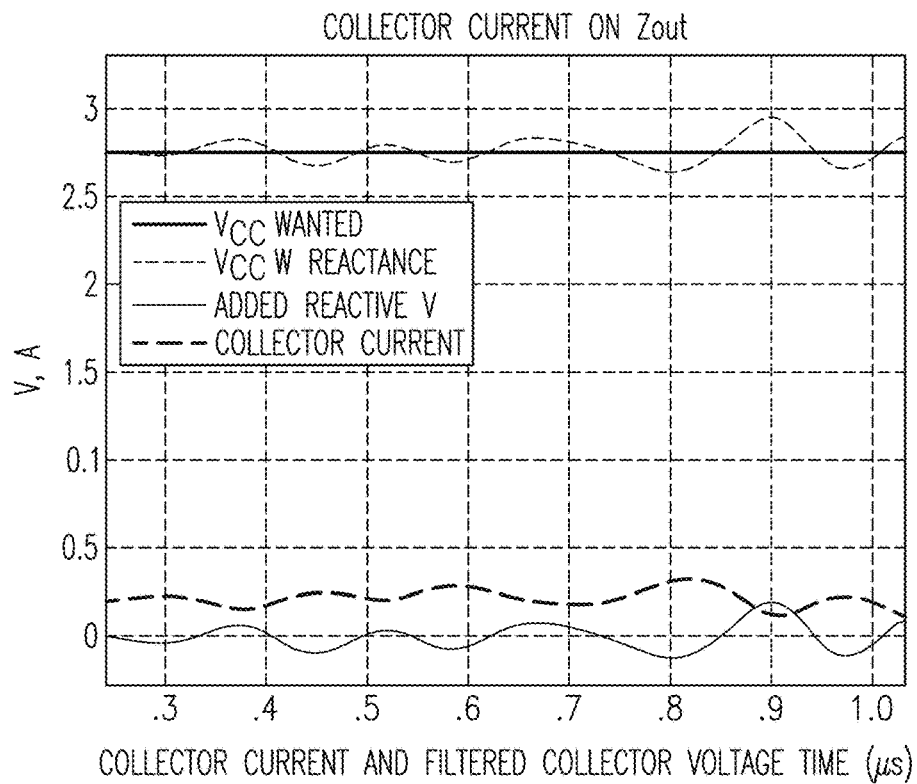
FIG. 5A is a graph of another example of collector current and voltage characteristics versus time.

FIG. 5A is a graph of another example of collector current and voltage characteristics versus time. The graph includes plot of wanted or desired $V_{CC}$, $V_{CC}$ accounting for reactance, an amount of added reactive voltage, and a collector current of the power amplifier.

While the desired voltage is constant, $V_{CC}$ has about 10% ripple due to the output reactance of the $V_{CC}$ filter when driven by the power amplifier's load current.

Figure 5B:
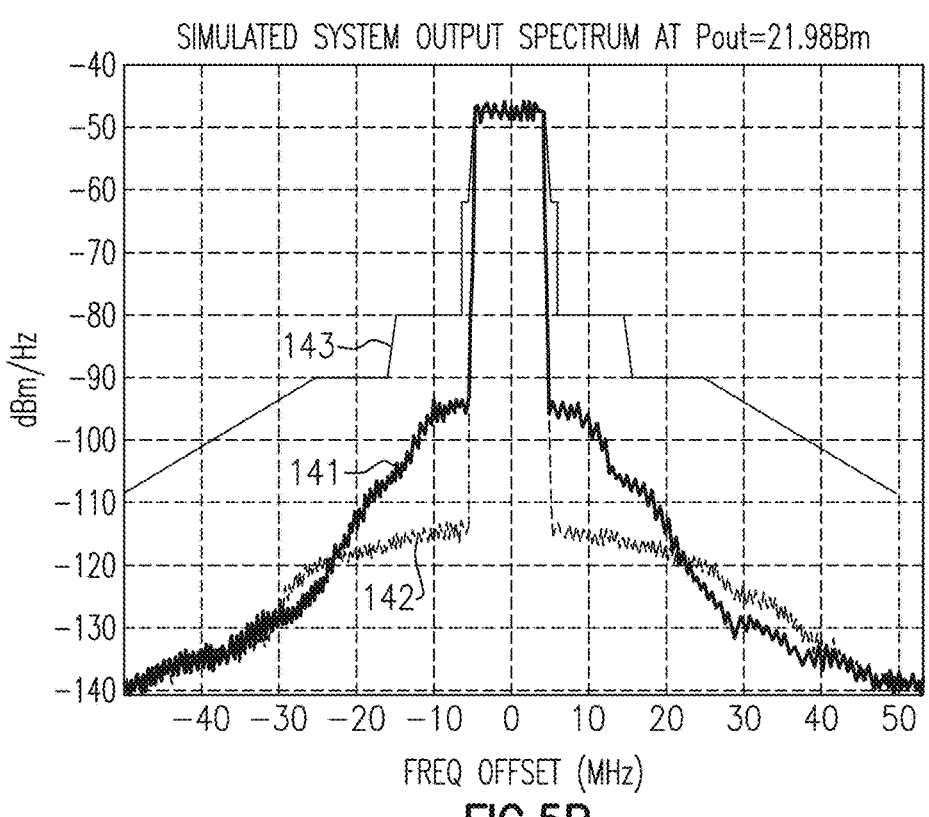
FIG. 5B is a graph of another example of system output spectrum.

FIG. 5B is a graph of another example of system output spectrum. The system output spectrum includes a calculated response 141 without consideration of reactance, a response 142 with added reactance to the filter model, and a reference response 143.

Figure 6:
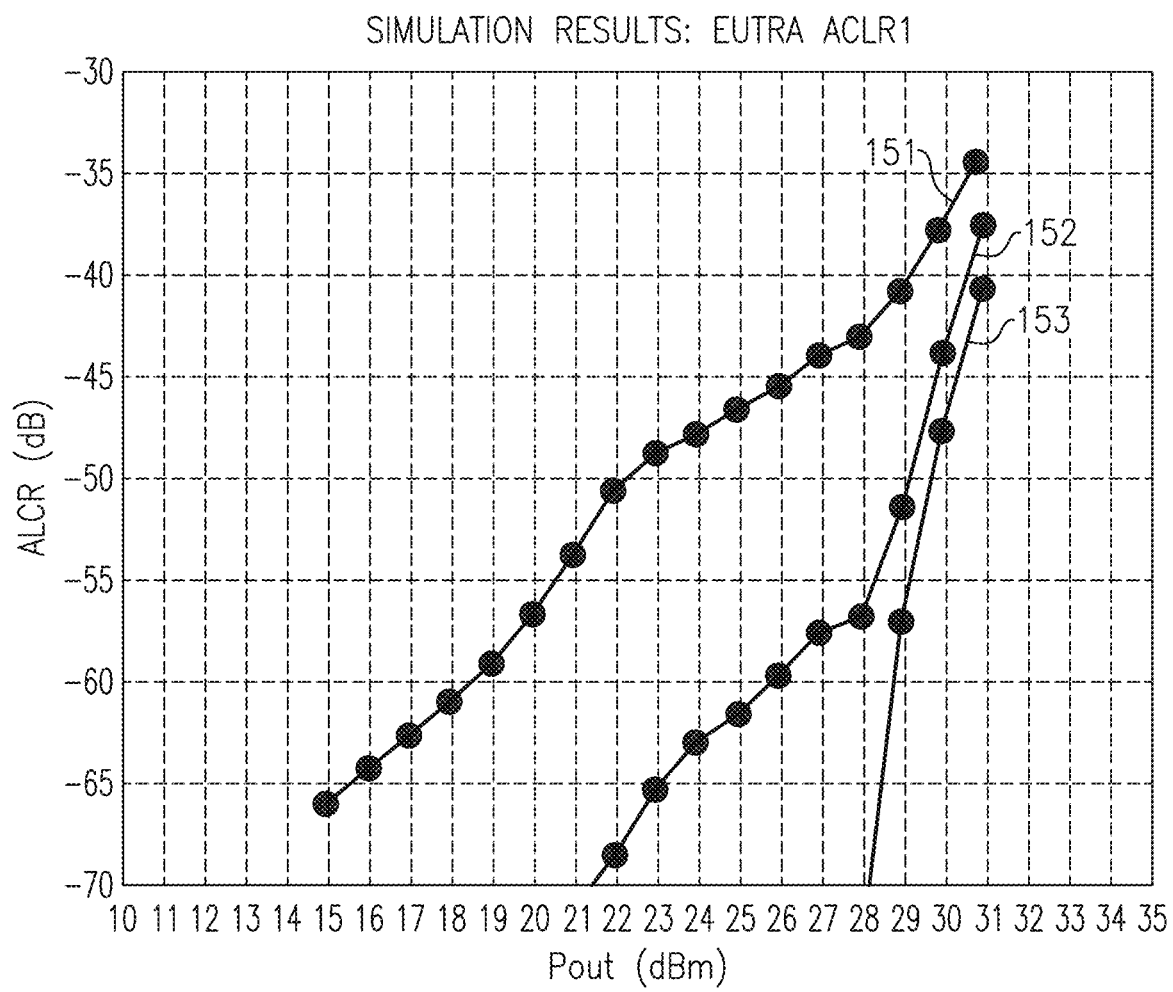
FIG. 6 is a graph of one example of adjacent channel leakage ratio versus output power.

FIG. 6 is a graph of one example of adjacent channel leakage ratio (ACLR) versus output power. The graph shows one example of ACLR improvement for LTE10. The graph includes a first simulation 151 with reactance considered, a second simulation 152 with reactance correction in DPD, and an ideal simulation 153.

Figure 7A:
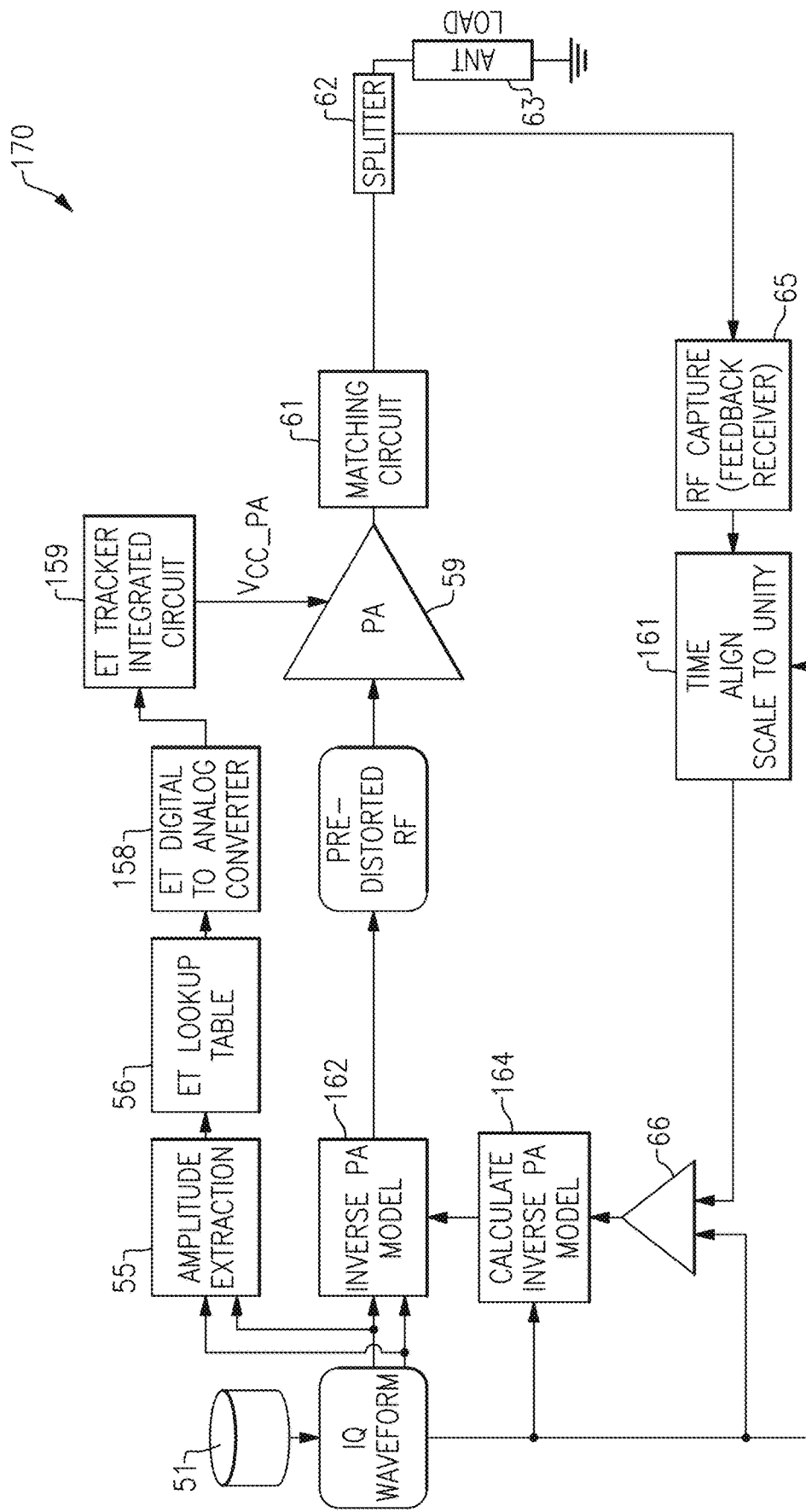
FIG. 7A is a schematic diagram of another embodiment of an envelope tracking system for a power amplifier.

FIG. 7A is a schematic diagram of another embodiment of an envelope tracking system 170. The envelope tracking system 170 includes baseband circuitry 51 that generates an I/Q waveform, amplitude extraction circuitry 55, an envelope tracking lookup table 56, envelope tracking digital to analog converter circuitry 158, an envelope tracking integrated circuit (IC) 159, a power amplifier 59, an output matching circuit 61, a signal splitter 62, an antenna 63 that serves as a load, an RF capture circuit or feedback receiver 65, a time align scale to unity circuit 161, a digital comparator 66, an inverse power amplifier calculation model 164, and an inverse power amplifier model 162 that generates a pre-distorted RF signal 163 for the power amplifier 59. In this example, the inverse power amplifier model 162 includes digital modeling circuitry for DPD calculations and an I/Q modulator for generating the pre-distorted RF signal based on digital signal data.

The power amplifier system 170 illustrates one example of a block diagram for DPD. In this example, the amplitude extraction circuit 55 extracts the envelope using the I/Q waveform prior to processing by the inverse power amplifier model 162.

Figure 7B:
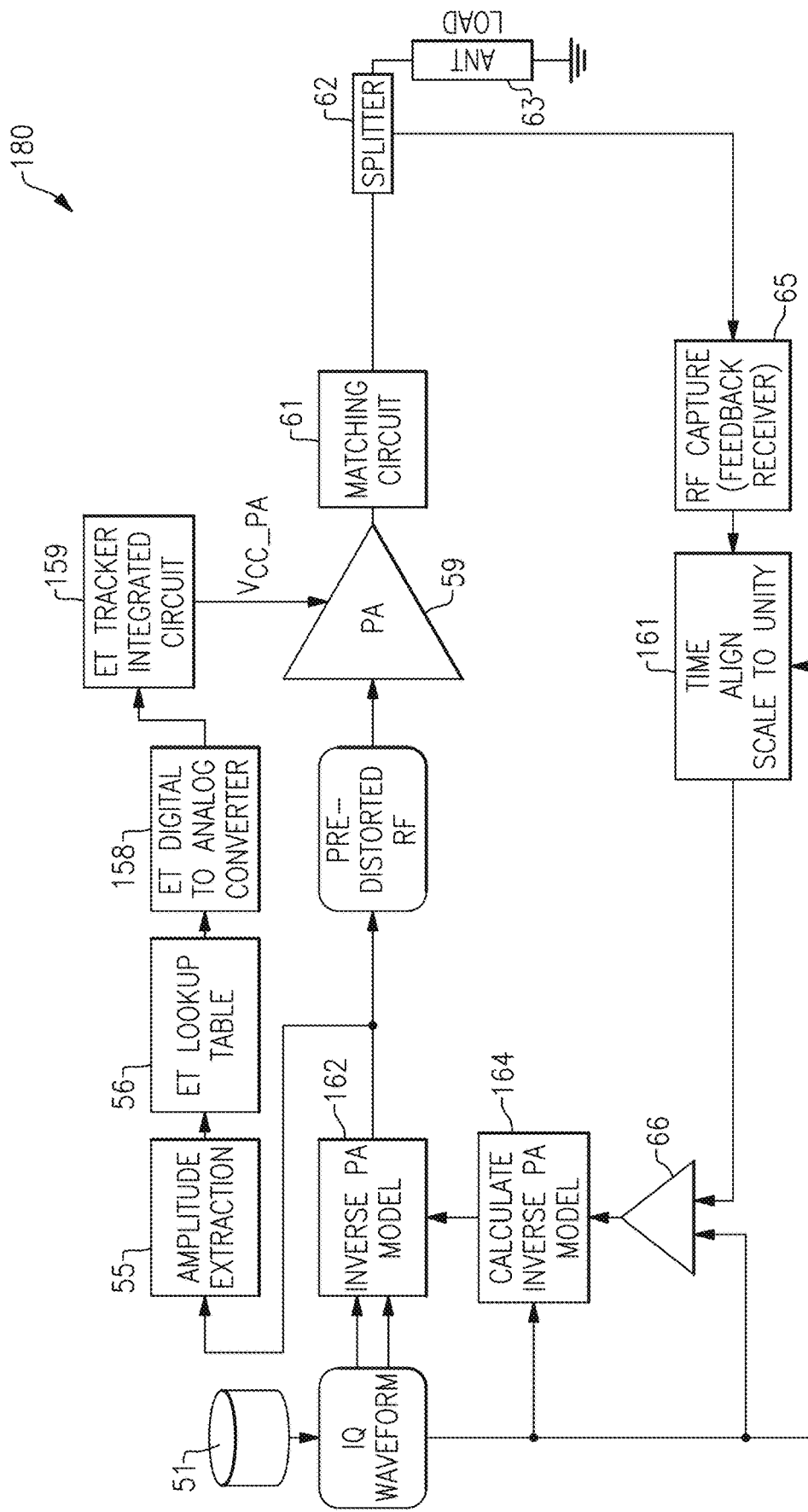
FIG. 7B is a schematic diagram of another embodiment of an envelope tracking system for a power amplifier.

FIG. 7B is a schematic diagram of another embodiment of an envelope tracking system 180. The envelope tracking system 180 of FIG. 7B is similar to the envelope tracking system 170 of FIG. 7A, except that the envelope tracking system 180 extracts the envelope of the RF signal based on I/Q waveform data after processing by the inverse power amplifier model 162.

Implementing an envelope tracking system to extract the envelope based on I/Q data that is processing by an inverse power amplifier model provides a number of advantages. For example, when mismatch is present in the power amplifier, the DPD operates to increase RF signal power to the power amplifier. By implementing envelope extraction as shown in FIG. 7B, more supply voltage is provided during saturation.

Figure 8A:
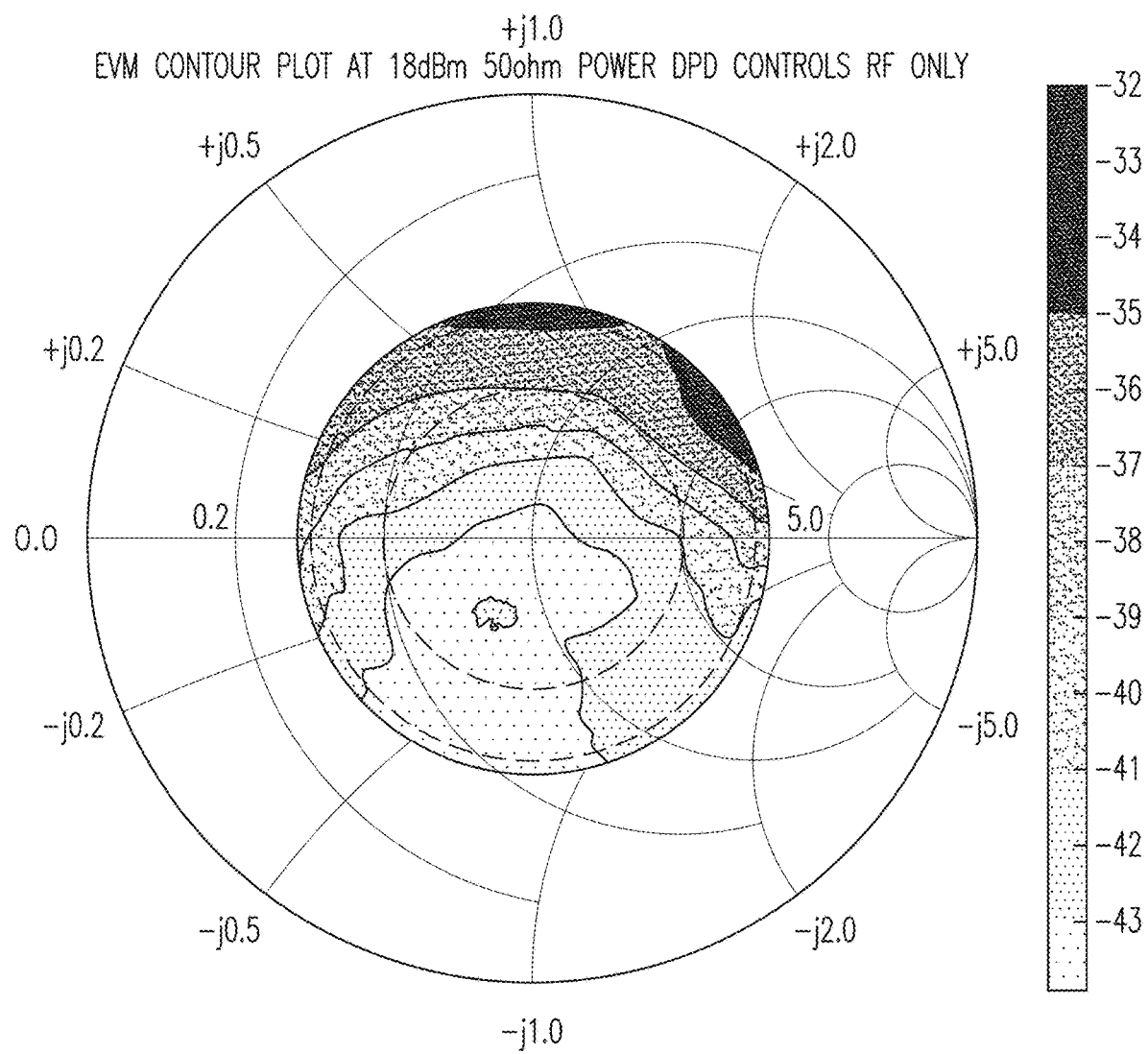
FIG. 8A is a Smith chart showing one example of error vector magnitude contours.

FIG. 8A is a Smith chart showing one example of error vector magnitude contours. The Smith chart illustrates EVM contour plots for one implementation of the envelope tracking system of FIG. 7A. In this example, ES5 18 dBm contour plots are depicted with DPD using a 50 voltage table.

Figure 8B:
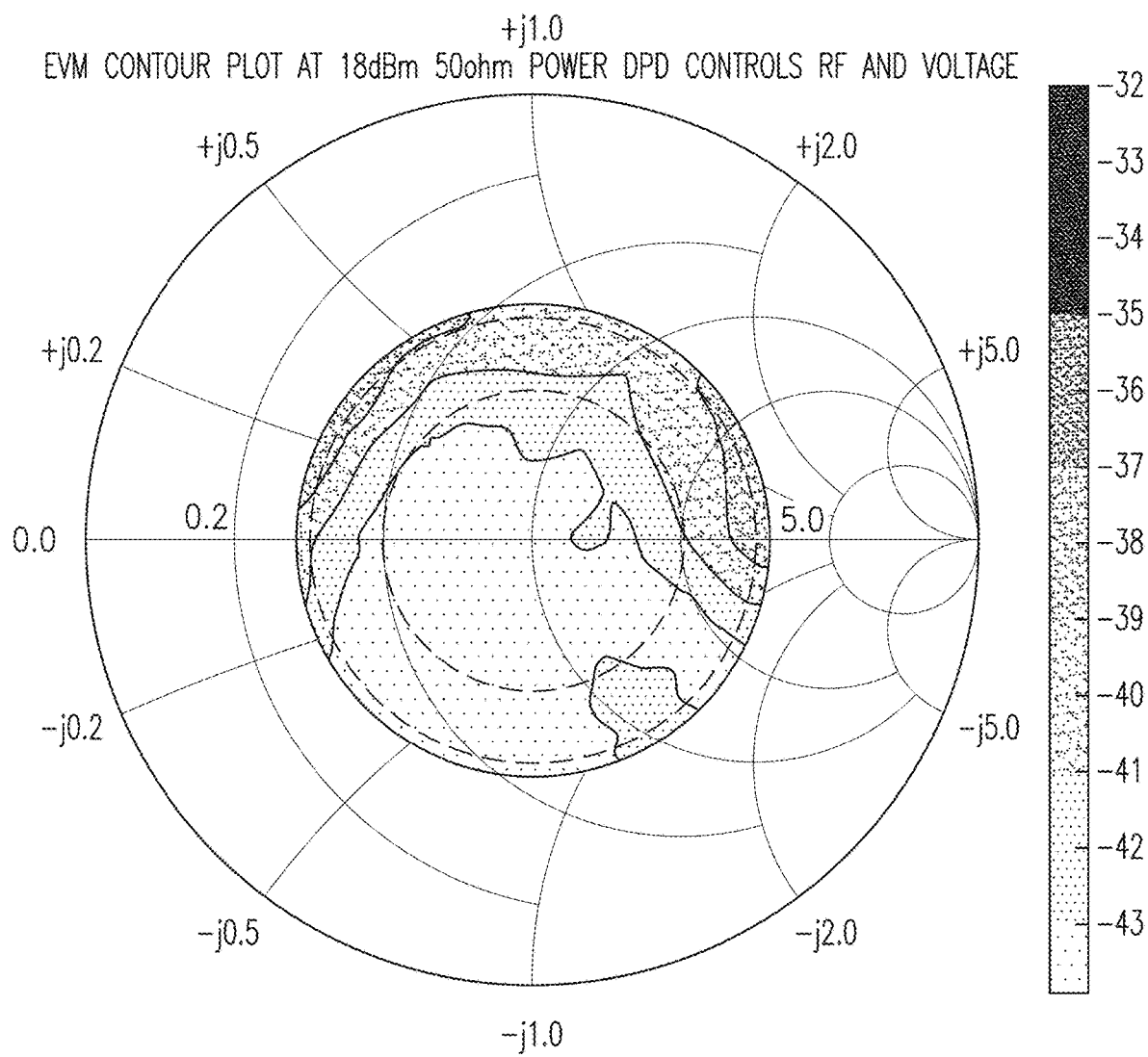
FIG. 8B is a Smith chart showing another example of error vector magnitude contours.

FIG. 8B is a Smith chart showing another example of error vector magnitude contours. The Smith chart illustrates EVM contour plots for one implementation of the envelope tracking system of FIG. 7B. In this example, ES5 18 dBm contour plots are depicted in which the voltage table is modified by DPD.

As shown by a comparison of FIG. 8B and FIG. 8A, implementing an envelope tracking system to extract the envelope based on I/Q data that is processing by an inverse power amplifier model can provide an improvement in EVM.

Figure 9:
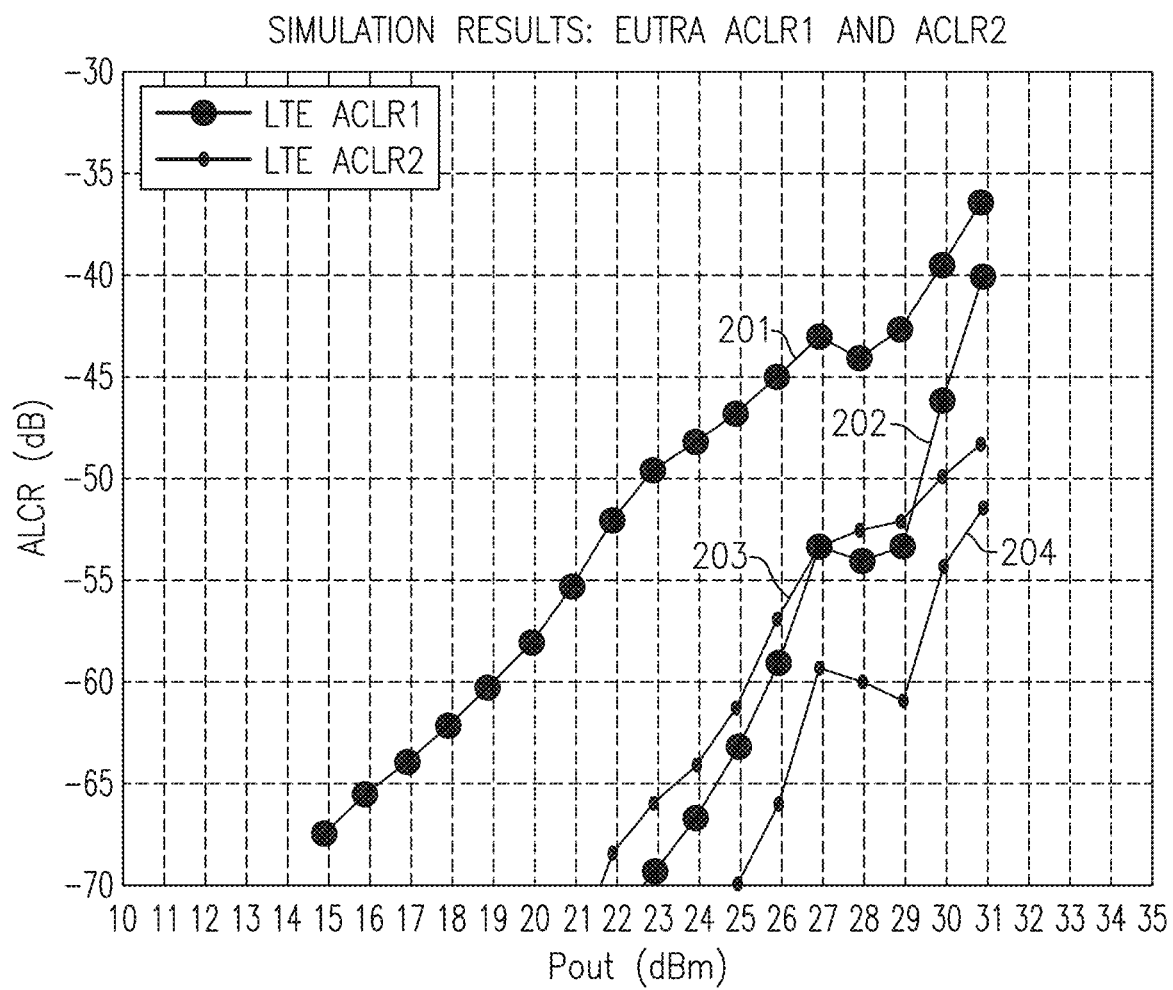
FIG. 9 is a graph of another example of adjacent channel leakage ratio versus output power.

FIG. 9 is a graph of another example of adjacent channel leakage ratio versus output power. The graph corresponds to simulations of LTE20 with 60 MHz DPD bandwidth, and includes a first simulation 201 of ACLR1 using calculated DPD response without consideration of reactance, a second simulation 202 of LTE ACLR1 with reactance added to the DPD filter model, a third simulation of 203 of ACLR2 using calculated DPD response without consideration of reactance, and a fourth simulation 204 of LTE ACLR2 with reactance added to the DPD filter model.

Figure 10:
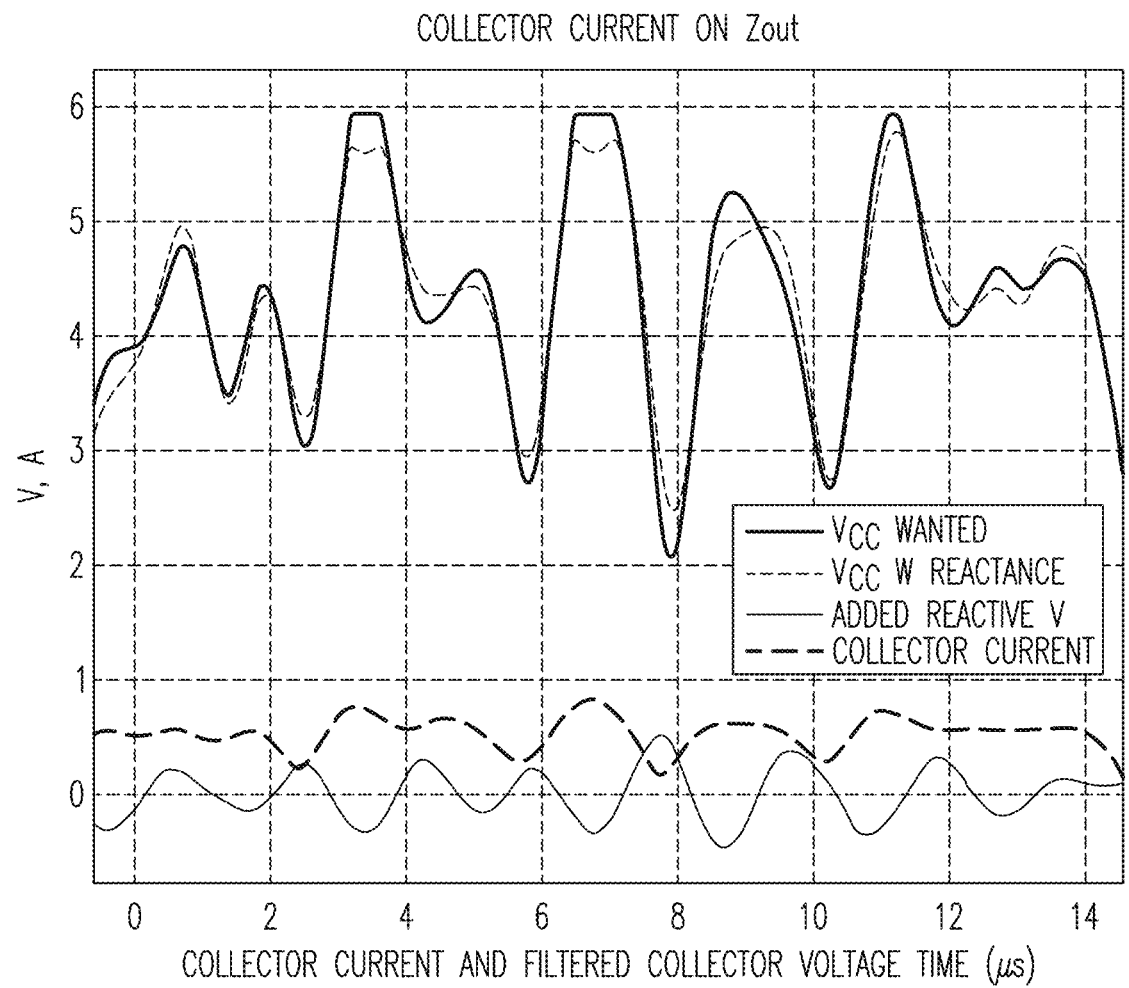
FIG. 10 is a graph of another example of collector current and voltage characteristics versus time.

FIG. 10 is a graph of another example of collector current and voltage characteristics versus time. The graph corresponds to a simulation of LTE20 100 resource block (RB) at 31 dBm output power and 60 MHz DPD bandwidth. The graph includes plot of wanted or desired $V_{CC}$, $V_{CC}$ accounting for reactance, an amount of added reactive voltage, and a collector current of the power amplifier.

Figure 11:
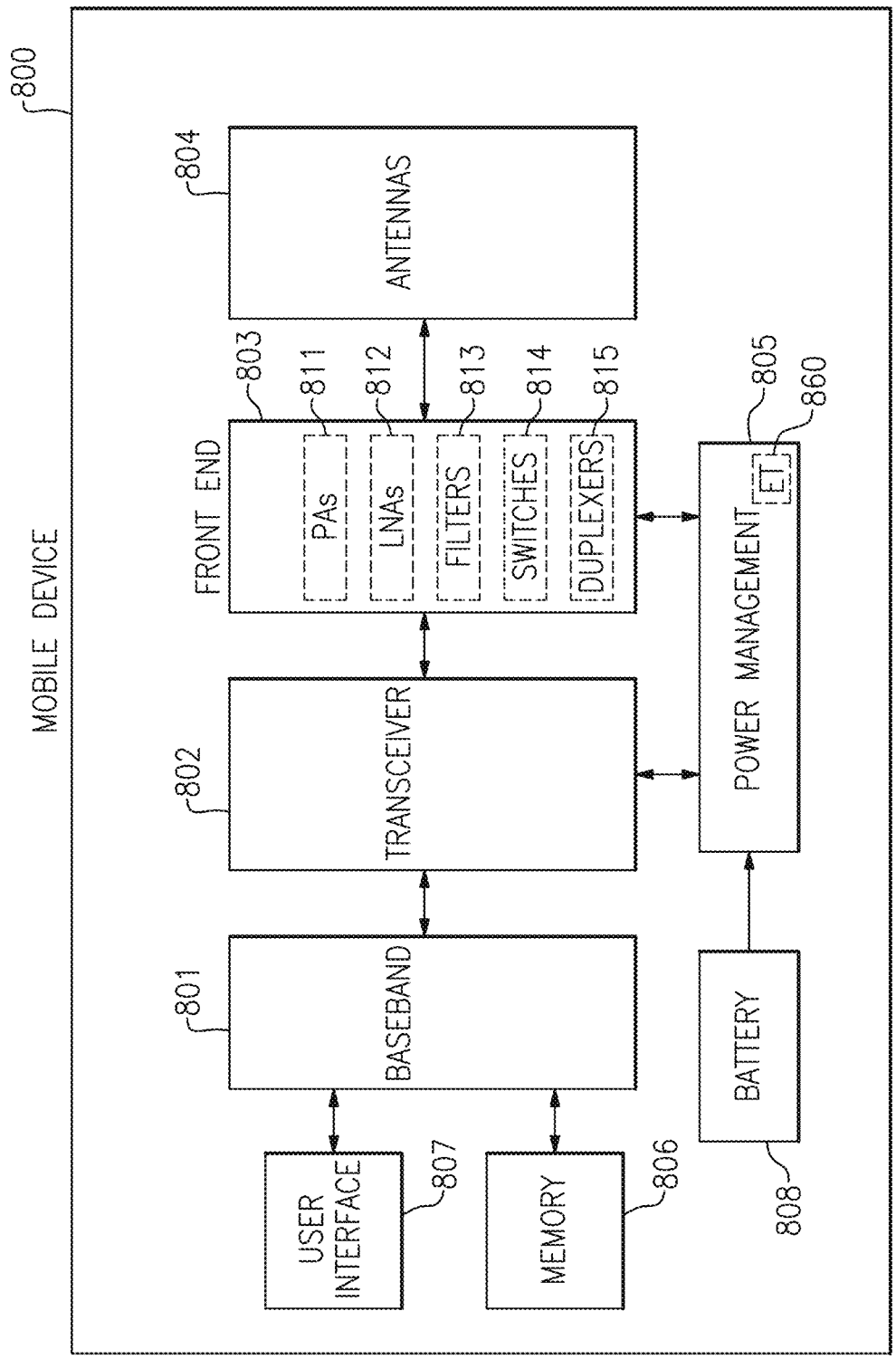
FIG. 11 is a schematic diagram of a mobile device according to another embodiment.

FIG. 11 is a schematic diagram of a mobile device 800 according to another embodiment. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G, WLAN (for instance, Wi-Fi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 11 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes power amplifiers (PAs) 811, low noise amplifiers (LNAs) 812, filters 813, switches 814, and duplexers 815. However, other implementations are possible.

For example, the front end system 803 can provide a number of functionalizes, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas associated transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include phase shifters having variable phase controlled by the transceiver 802. Additionally, the phase shifters are controlled to provide beam formation and directivity for transmission and/or reception of signals using the antennas 804. For example, in the context of signal transmission, the phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 11, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. The power management system 805 can include an envelope tracker 860 implemented in accordance with one or more features of the present disclosure. Additionally, the mobile device 800 can be implemented with an envelope tracking system that includes the envelope tracker 860.

As shown in FIG. 11, the power management system 805 receives a battery voltage form the battery 808. The battery 808 can be any suitable battery for use in the mobile device 800, including, for example, a lithium-ion battery.

Figure 12:
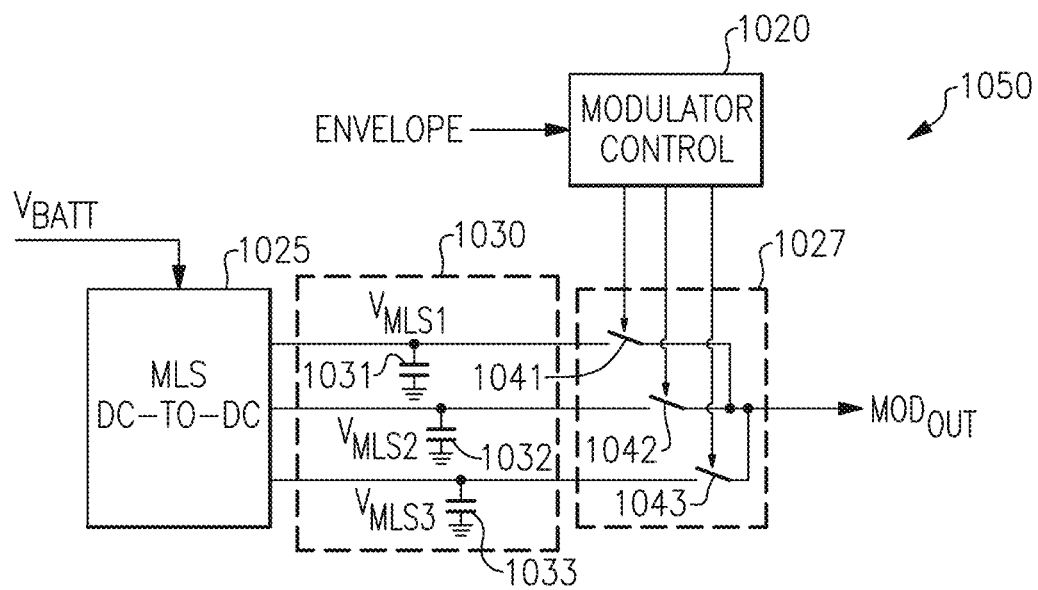
FIG. 12 is a schematic diagram of a multi-level supply (MLS) modulation system according to one embodiment.

FIG. 12 is a schematic diagram of an MLS modulation system according to one embodiment. The MLS modulation system 1050 includes a modulator control circuit 1020, an MLS DC-to-DC converter 1025, a modulator switch bank 1027, and a decoupling capacitor bank 1030.

The MLS modulation system 1050 of FIG. 12 illustrates one implementation of MLS modulator circuitry suitable for incorporation in a multi-level envelope tracker. However, other implementations of MLS modulator circuitry can be included in multi-level envelope trackers implemented in accordance with the teachings herein.

The MLS DC-to-DC converter 1025 generates a first regulated voltage $V_{MLS1}$, a second regulated voltage $V_{MLS2}$, and a third regulated voltage $V_{MLS3}$ based on providing DC-to-DC conversion of a battery voltage $V_{BATT}$. Although an example with three regulated voltages is shown, the MLS DC-to-DC converter 1025 can generate more or fewer regulated voltages. In certain implementations, at least a portion of the regulated voltages are boosted relative to the battery voltage $V_{BATT}$. Additionally or alternatively, one or more of the regulated voltages is a buck voltage having a voltage lower than the battery voltage $V_{BATT}$.

The decoupling capacitor bank 1030 aids in stabilizing the regulated voltages generated by the MLS DC-to-DC converter 1025. For example, the decoupling capacitor bank 1030 of FIG. 12 includes a first decoupling capacitor 1031 for decoupling the first regulated voltage $V_{MLS1}$, a second decoupling capacitor 1032 for decoupling the second regulated voltage $V_{MLS2}$, and a third decoupling capacitor 1033 for decoupling the third regulated voltage $V_{MLS3}$.

With continuing reference to FIG. 12, the modulator switch bank 1027 includes a first switch 1041 connected between the modulator's output ($MOD_{OUT}$) and the first regulated voltage $V_{MLS1}$, a second switch 1042 connected between the modulator's output and the second regulated voltage $V_{MLS2}$, and a third switch 1043 connected between the modulator's output and the third regulated voltage $V_{MLS3}$. The modulator control 1020 operates to selectively open or close the switches 1041-1043 based on an envelope signal ENVELOPE to thereby control the modulator's output.

Figure 13:
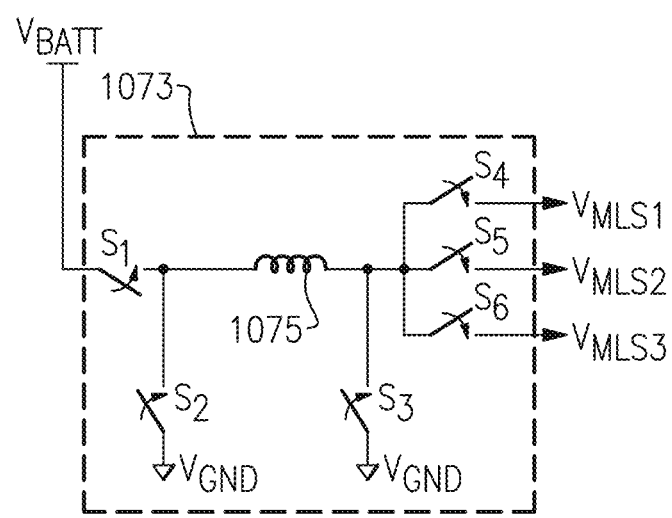
FIG. 13 is a schematic diagram of an MLS DC-to-DC converter according to one embodiment.

FIG. 13 is a schematic diagram of an MLS DC-to-DC converter 1073 according to one embodiment. The MLS DC-to-DC converter 1073 includes an inductor 1075, a first switch $S_1$, a second switch $S_2$, a third switch $S_3$, a fourth switch $S_4$, a fifth switch $S_5$, and a sixth switch $S_6$. The MLS DC-to-DC converter 1073 further includes control circuitry (not shown in FIG. 13) for opening and closing the switches to provide regulation.

The MLS DC-to-DC converter 1073 of FIG. 13 illustrates one implementation of an MLS DC-to-DC converter suitable for incorporation in a multi-level envelope tracker. However, other implementations of MLS DC-to-DC converters can be included in multi-level envelope trackers implemented in accordance with the teachings herein.

In the illustrated embodiment, the first switch $S_1$ includes a first end electrically connected to the battery voltage $V_{BATT}$ and a second end electrically connected to a first end of the second switch $S_2$ and to a first end of the inductor 1075. The second switch $S_2$ further includes a second end electrically connected to a first or ground supply $V_{GND}$. Although FIG. 13 illustrates a configuration of a DC-to-DC converter that is powered using a ground supply and a battery voltage, the teachings herein are applicable to DC-to-DC converters powered using any suitable power supplies. The inductor 1075 further includes a second end electrically connected to a first end of each of the third to sixth switches $S_3$-$S_6$. The third switch $S_3$ further includes a second end electrically connected to the ground supply $V_{GND}$. The fourth, fifth, and sixth switches $S_4$-$S_6$ each include a second end configured to generate the first, second, and third regulated voltages $V_{MLS1}$, $V_{MLS2}$, and $V_{MLS3}$, respectively.

The first to sixth switches $S_1$-$S_6$ are selectively opened or closed to maintain regulated voltages within a particular error tolerance of target voltage levels. Although an example with three regulated voltages is shown, the MLS DC-to-DC converter 1073 can be implemented to generate more or fewer regulated voltages.

In the illustrated embodiment, the MLS DC-to-DC converter 1073 operates as a buck-boost converter operable to generate regulated boost voltages greater than the battery voltage $V_{BATT}$ and/or regulated buck voltages lower than the battery voltage $V_{BATT}$. However, other implementations are possible.

CONCLUSION

Some of the embodiments described above have provided examples in connection with mobile devices. However, the principles and advantages of the embodiments can be used for any other systems or apparatus that have needs for envelope tracking.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An envelope tracking system comprising:
   a modulator configured to generate a radio frequency signal based on a digital transmit signal, the radio frequency signal having a signal envelope;
   a supply voltage filter configured to filter a power amplifier supply voltage having a voltage level that changes in relation to the signal envelope;
   a power amplifier configured to amplify the radio frequency signal, and to receive power from the power amplifier supply voltage;
   a shaping circuit configured to generate shaped envelope data based on a digital representation of the signal envelope; and
   a digital modeling circuit operable to receive the shaped envelope data, and to compensate the digital transmit signal for distortion arising from the supply voltage filter.

2. The envelope tracking system of claim 1 further comprising a digital-to-analog converter configured to generate an envelope signal based on the shaped envelope data, and an envelope tracker configured to control the voltage level of the power amplifier supply voltage based on the envelope signal.

3. The envelope tracking system of claim 2 wherein the envelope tracker is a multi-level envelope tracker including a DC-to-DC converter configured to output a plurality of regulated voltages and an envelope modulator having an output configured to control the power amplifier supply voltage based on the plurality of regulated voltages and the envelope signal.

4. The envelope tracking system of claim 1 further comprising an amplitude extraction circuit configured to generate the digital representation of the signal envelope.

5. The envelope tracking system of claim 4 further comprising a digital pre-distortion circuit configured to digitally pre-distort the digital transmit signal, the amplitude extraction circuit configured to generate the digital representation of the signal envelope based on the digital transmit signal after digital pre-distortion.

6. The envelope tracking system of claim 4 wherein the amplitude extraction circuit includes a coordinate rotation digital computation circuit.

7. The envelope tracking system of claim 1 wherein the shaping circuit includes an envelope tracking lookup table mapping a plurality of envelope levels of the digital representation of the signal envelope to a plurality of corresponding shaped envelope levels of the shaped envelope data.

8. The envelope tracking system of claim 1 wherein the supply voltage filter includes a series inductor and a shunt capacitor.

9. A mobile device comprising:
   a transceiver configured to generate a radio frequency signal based on a digital transmit signal, the radio frequency signal having a signal envelope;
   a front end circuit including a supply voltage filter configured to filter a power amplifier supply voltage having a voltage level that changes in relation to the signal envelope, and a power amplifier configured to amplify the radio frequency signal and to receive power from the power amplifier supply voltage; and
   a baseband circuit including a shaping circuit configured to generate shaped envelope data based on a digital representation of the signal envelope, and a digital modeling circuit operable to receive the shaped envelope data, and to compensate the digital transmit signal for distortion arising from the supply voltage filter.

10. The mobile device of claim 9 further comprising a power management system including a digital-to-analog converter configured to generate an envelope signal based on the shaped envelope data, and an envelope tracker configured to control the voltage level of the power amplifier supply voltage based on the envelope signal.

11. The mobile device of claim 10 wherein the envelope tracker is a multi-level envelope tracker including a DC-to-DC converter configured to output a plurality of regulated voltages and an envelope modulator having an output configured to control the power amplifier supply voltage based on the plurality of regulated voltages and the envelope signal.

12. The mobile device of claim 9 wherein the baseband circuit further includes an amplitude extraction circuit configured to generate the digital representation of the signal envelope.

13. The mobile device of claim 12 wherein the baseband circuit further includes a digital pre-distortion circuit configured to digitally pre-distort the digital transmit signal, the amplitude extraction circuit configured to generate the digital representation of the signal envelope based on the digital transmit signal after digital pre-distortion.

14. The mobile device of claim 12 wherein the amplitude extraction circuit includes a coordinate rotation digital computation circuit.

15. The mobile device of claim 9 wherein the shaping circuit includes an envelope tracking lookup table mapping a plurality of envelope levels of the digital representation of the signal envelope to a plurality of corresponding shaped envelope levels of the shaped envelope data.

16. The mobile device of claim 9 wherein the supply voltage filter includes a series inductor and a shunt capacitor.

17. A method of envelope tracking, the method comprising:
   generating a radio frequency signal based on a digital transmit signal, the radio frequency signal having a signal envelope;
   filtering a power amplifier supply voltage having a voltage level that changes in relation to the signal envelope using a supply voltage filter;

powering a power amplifier with the power amplifier supply voltage, and amplifying the radio frequency signal using the power amplifier;

generating shaped envelope data based on a digital representation of the signal envelope using a shaping circuit; and compensating the digital transmit signal for distortion arising from the supply voltage filter using a digital modeling circuit that receives the shaped envelope data.

18. The method of claim 17 further comprising generating an envelope signal from the shaped envelope data using a digital-to-analog converter, and controlling the voltage level of the power amplifier supply voltage based on the envelope signal using an envelope tracker.

19. The method of claim 17 further comprising generating the digital representation of the signal envelope using an amplitude extraction circuit.

20. The method of claim 19 further comprising digitally pre-distorting the digital transmit signal using a digital pre-distortion circuit, and using the amplitude extraction circuit to generate the digital representation of the signal envelope based on the digital transmit signal after digital pre-distortion.

* * * * *